United States Patent
Chennen et al.

(10) Patent No.: US 12,417,217 B2
(45) Date of Patent: *Sep. 16, 2025

(54) MULTI-TENANT DATABASE RESOURCE UTILIZATION

(71) Applicant: Salesforce, Inc., San Francisco, CA (US)

(72) Inventors: Pratheesh Ezhapilly Chennen, Fremont, CA (US); Prakash Ramaswamy, Morrisville, NC (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,460

(22) Filed: Apr. 10, 2024

(65) Prior Publication Data

US 2024/0256508 A1    Aug. 1, 2024

Related U.S. Application Data

(63) Continuation of application No. 17/645,536, filed on Dec. 22, 2021, now Pat. No. 11,983,153.

(51) Int. Cl.
*G06F 16/30* (2019.01)
*G06F 16/21* (2019.01)
*G06F 16/27* (2019.01)

(52) U.S. Cl.
CPC ............ *G06F 16/217* (2019.01); *G06F 16/27* (2019.01)

(58) Field of Classification Search
CPC ............................... G06F 16/217; G06F 16/27
See application file for complete search history.

(56) References Cited

U.S. PATENT DOCUMENTS

| | | | |
|---|---|---|---|
| 8,914,582 B1 | 12/2014 | Trimble et al. | |
| 9,491,112 B1 | 11/2016 | Patel et al. | |
| 11,093,294 B2 | 8/2021 | Wang et al. | |
| 2018/0123907 A1 | 5/2018 | Raman et al. | |
| 2018/0165109 A1* | 6/2018 | Feng | G06F 9/5077 |
| 2019/0034241 A1 | 1/2019 | Badjatia et al. | |
| 2019/0104017 A1* | 4/2019 | Khosrowpour | H04L 41/0813 |
| 2019/0213099 A1* | 7/2019 | Schmidt | G06N 3/044 |
| 2020/0403930 A1 | 12/2020 | Das et al. | |
| 2021/0105317 A1 | 4/2021 | Kona | |
| 2021/0224106 A1 | 7/2021 | Wang et al. | |

(Continued)

OTHER PUBLICATIONS

U.S. Appl. No. 17/645,536, Non Final Office Action mailed Feb. 21, 2023, 10 pgs.

(Continued)

*Primary Examiner* — Khanh B Pham
(74) *Attorney, Agent, or Firm* — Polygon IP, LLP

(57) ABSTRACT

Some implementations of the disclosed systems, apparatus, methods and computer program products may provide for determination of resource usage by tenants in a multi-tenant server system. Tenants may provide resource requests to a database of the multi-tenant server system and such resource requests may include context data. Periodic snapshots of the database may be performed to determine the pending resource requests received by the various tenants and, based on the snapshots and the context data, the resource usage of the various tenants, as well as the system as a whole, may be determined and forecasted for the future.

20 Claims, 6 Drawing Sheets

(56) References Cited

U.S. PATENT DOCUMENTS

| | | | |
|---|---|---|---|
| 2023/0179539 A1* | 6/2023 | Brown | H04L 47/781 |
| | | | 709/226 |
| 2023/0195703 A1 | 6/2023 | Chennen | |
| 2023/0275799 A1* | 8/2023 | Boldt | H04L 41/149 |
| | | | 709/224 |

OTHER PUBLICATIONS

U.S. Appl. No. 17/645,536, Notice of Allowance mailed Jan. 18, 2024, 8 pgs.

U.S. Appl. No. 17/645,536, Final Office Action mailed Jun. 27, 2023, 12 pgs.

* cited by examiner

MULTI-TENANT DATABASE RESOURCE UTILIZATION

CROSS-REFERENCE TO RELATED APPLICATIONS

This application is a continuation of, and claims priority to, co-pending and commonly assigned U.S. patent application Ser. No. 17/645,536 by Pratheesh Ezhapilly Chennen et al., titled Multi-Tenant Database Resource Utilization, filed on Dec. 22, 2021, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to multi-tenant server systems and more specifically to system for monitoring individual resource usages within the multi-tenant server systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Certain cloud computing services may utilize multi-tenant server systems. Such systems may not include any logical or physical boundaries separating the tenants. As such, the tenants may all share the resources of the multi-tenant server system.

BRIEF DESCRIPTION OF THE DRAWINGS

The included drawings are for illustrative purposes and serve only to provide examples of possible structures and operations for the disclosed inventive systems, apparatus, methods and computer program products for tenant resource utilization measurement for a multi-tenant server system. These drawings in no way limit any changes in form and detail that may be made by one skilled in the art without departing from the spirit and scope of the disclosed implementations.

DETAILED DESCRIPTION

Figure 1:
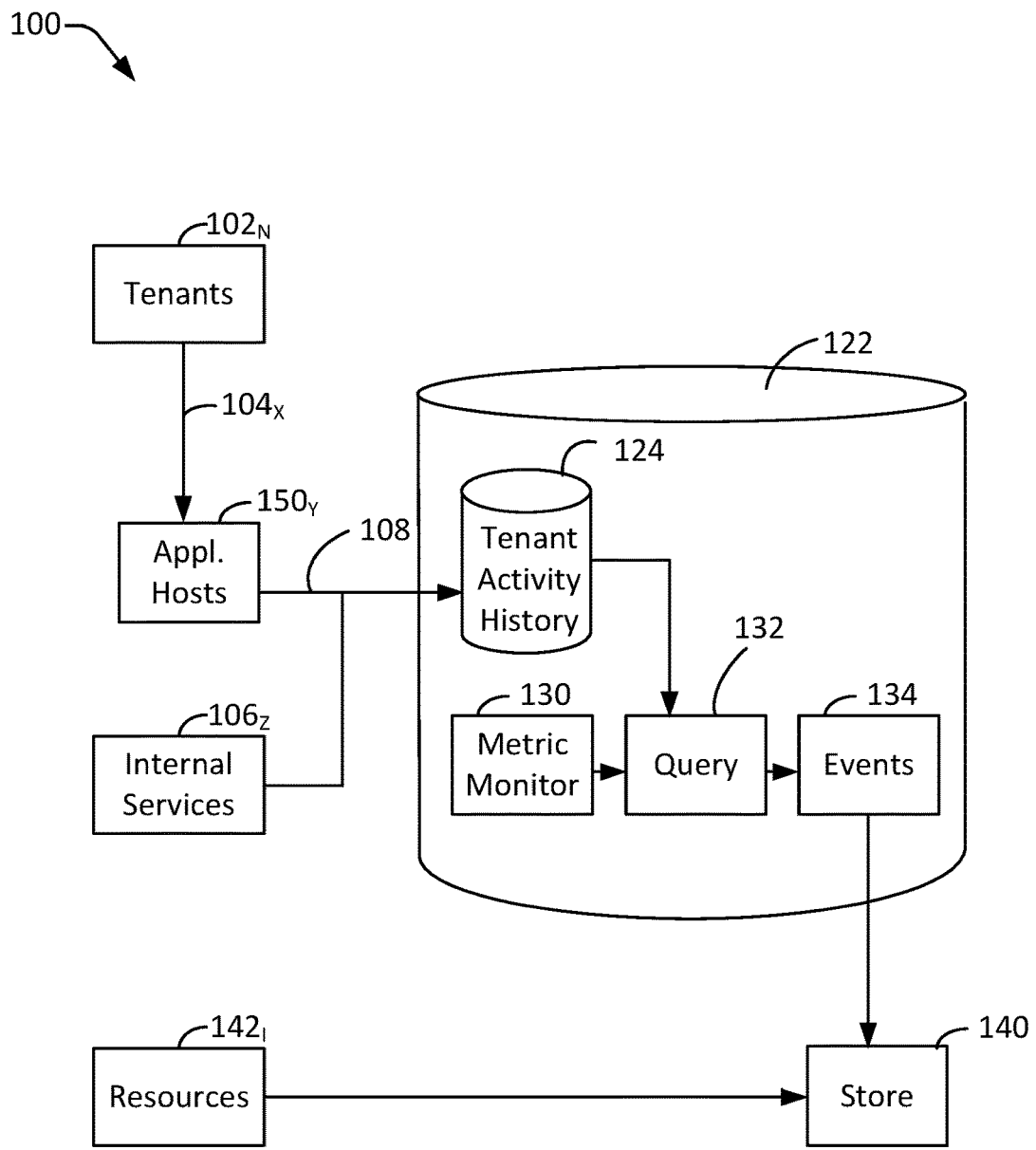
FIG. 1 illustrates an example of an arrangement of components in a multi-tenant computing system, configured in accordance with one or more embodiments.

Some implementations of the disclosed systems, apparatus, methods and computer program products are configured to provide for determination of resource usage by tenants in a multi-tenant server system (e.g., where containers, file systems, servers, and/or other resources or systems are shared between the tenants). The systems and techniques described herein allow for determination of resource usage by each tenant of a multi-tenant server system. In various implementations, tenants may provide resource requests to a database of the multi-tenant server system. The resource requests may include context data. The context data may allow for determination of aspects of the resource requests. As such, in certain implementations, a periodic snapshot of the database may be performed to determine the pending resource requests received by the various tenants and such snapshots may include context data. Utilizing the context data within the resource requests, the resource usage of the various tenants, as well as the system as a whole, may be determined. Such a determination may be utilized for superior resource forecasting to allow for improved configuring of such multi-tenant server systems.

Typically, the amount of resources utilized by a tenant is determined by the application (e.g., application of the server system) responding to the request. The application may provide for a determination of the resources used in a granular manner. However, determination of the resources used by the application requires a high amount of processing resources by itself. Furthermore, such measurement techniques require the application to positively identify the requesting tenant. Otherwise, tenants may be missed and not properly accounted for. This is especially problematic for child requests (e.g., follow on requests resulting from an initial request), where the initial requesting entity of the parent request is typically not included in the follow on request. Utilization of applications for such forecasting is problematic as the application is configured for providing the resources and not for positively identifying the user that is originating the request. This results in less accurate forecasts, as the identity and context of requests are important for determining accurate forecasts (e.g., certain users may cancel their tenancy, other users may have already indicated that they intend to increase their usage, certain requests may be associated with certain one-time events such as an outage, and/or other such contexts).

By contrast, snapshots of the requests stored within the database allow for context data to be obtained, for more accurate forecasts. For example, the forecasts may be adjusted if a user has indicated that it intends to cancel their tenancy (such resource usage may be ignored for future forecasts), usages of users indicating that they intend to increase their usage in the future may be adjusted upward, and requests where the context data indicates that the request is associated with one-time events may not be as heavily weighted within a forecast.

HeroHock offers a multi-tenant service that allows for tenants to request and receive various services, such as a memory, processing, accelerator, Application Programming Interface (API), software, and/or other such services. The multi-tenant service offered by HeroHock does not include physical boundaries between the various tenants. As such, the resources offered by HeroHock are shared between all tenants of HeroHock.

HeroHock tracks the resource usage of its tenants through applications located within its multi-tenant server system. However, the application is only able to track tenant usage when a resource request to the application identifies the tenant that is requesting the resource. Follow-on requests and certain requests that do not identify the tenant are not tracked. The result is that HeroHock loses valuable data, is unable to credit certain requests to the requesting user, and is unable to forecast properly. Due to the deficiency in forecasting, HeroHock is forced to invest in a larger amount of capacity than what is needed, wasting resources and, additionally, being forced to expend processing resources to perform the inefficient tracking.

FIG. 1 illustrates an example of an arrangement of components in a multi-tenant computing system, configured in accordance with one or more embodiments. FIG. 1 illustrates system 100 that includes one or more tenants 102N, one or more application hosts 150Y, one or more internal services 106Z, database 122, one or more resources 1421, and store 140. Store 122 may include tenant activity history 124, metric monitor 130, querying 132, and events framework 134. It is appreciated that, for the purposes of this disclosure, reference to various components may include singular or plural amounts of such components.

In various embodiments, tenants 102N may provide requests 104X to application hosts 150Y. Such requests may be resource requests and/or requests to utilize one or more services provided by a multi-tenant system. Application hosts 150Y may then communicate the requests to production database 122. Production database 122 may then cause internal services 106Z to provide the corresponding resources requested to tenants 102N. Additionally, application hosts 150Y and internal services 106Z may provide context data 108 to production database 122. Context data 108 may include the context of requests 104X, such as the identity of the requesting user, the resources requested, the duration of the resources requested, and/or the amount of resources requested. Production database 122 may store such context data 108 within tenant activity history 124, which may be a shared or designated database within production database 122. Tenant activity history 124 may store such context data 108 for a period of time of any duration. In various embodiments, internal services 106Z may provide the requested resources before, during, and/or after context data 108 has been communicated to production database 122.

Tenant activity history 124 may store context data 108 of requests 104X for determination of resource utilization by one or more tenants 102N. Variously, periodic snapshots of requests 104X may be queried and obtained to determine resource usage by the tenants. Metric monitor 130 may be configured to obtain such snapshots. Thus, metric monitor 130 may provide periodic queries 132 to tenant activity history 124 to obtain requests 104X associated with a specific time period. Such periodic queries 132 may be provided to tenant activity history 124 during any period, such as every second, every 10 seconds, every 30 seconds, every minute, every 15 minutes, every half hour, every hour, and/or another such period. In certain embodiments, the period may be adjusted based on input and/or a certain determination such as a machine learning determination of the optimal period for sampling.

Accordingly, query 132 obtains requests 104X that includes context 108 from tenant activity history 124. Context 108 may include any context data as described herein, such as the identity of the requesting user, the type and/or amount of resources requested, the duration for providing the resources requested, the priority of the resource request, and/or other such details associated with the request. Each query 132 may obtain requests 104X for a specific time or time period.

Based on the data obtained via each query 132, an event 134 may be created. Such an event 134 may include all requests 104X within a certain timeframe (e.g., at a certain time, such as 6:00 pm, or during a certain timeframe, such as for a minute from 6:00 pm), all requests 104X meeting certain conditions (e.g., associated with certain tenants), and/or requests 104X that would otherwise allow for a snapshot of certain conditions and/or situations. In certain embodiments, the data obtained by query 132 may be before, during, and/or after the providing of the resources. Thus, for example, in certain embodiments, tenant activity history 124 may store request 104X and/or context 108 for later communication. Such a configuration may allow for retroactive determination of resources utilized by the system. Accordingly, determination of resources used and/or forecasting of future resources may be performed when the system has spare resources for utilization, preventing slowdowns of systems and/or allowing for valuable resources to be used in more valuable and urgent situations.

In certain embodiments, requests 104X may be requests for certain resources and context 108 may be context data that is provided independent of requests 104X. Thus, for example, tenants 102N may provide requests 104X to application hosts 105Y. Based on such requests 104X, application hosts 105Y may accordingly generate context data 108. Such context data 108 may be associated with a corresponding request 104 X, such as via a request identifier (e.g., an identifying number). One or both of context data 108 and/or the associated requests 104X may then be communicated to production database 122 and stored within production database 122. One or both of context data 108 and/or the associated requests 104X may then be accordingly provided based on query 132.

Each snapshot of context data 108 and/or the associated requests 104X may be considered an event. Such a snapshot may be, for example, a snapshot of resources used during a certain time and/or timeframe. Various snapshots may be combined into a collection of events (e.g., of events 134) to allow for a determination of resources usages over a point in time and/or a period of time. Such a collection may then be utilized to provide forecasting of resource usage and/or for determination of the parties that are utilizing the resources.

In certain embodiments, data of such events 134 may be provided to an application and/or an application store 140. The application and/or application store 140 (e.g., via determination of an appropriate application to provide such services) may then provide for forecasting of resources needed (e.g., for a future time period). For example, application store 140 may select one or more resources 1421, which may include one or more applications and/or other resources, for providing such forecasting. Thus, for example, such an application may be a machine learning application that may utilize the data of such events 134 to provide for forecasting of future usage of the data. In another embodiment, such an application may be an application configured to utilize the data of events 134 (e.g., the context data) and provide one or more curve fits and/or via other forecasting algorithms to determine further processing requirements. Other embodiments may utilize other techniques to provide for forecasting.

In certain embodiments, where each of events 134 is an instantaneous snapshot of resource usage (e.g., indicates resource usage during a specific point in time), the forecasting may be configured to utilize the instantaneous determinations to providing forecasting for a continuous period of time. Such a forecasting technique may, for example, assume that the resource usage sampled during a snapshot is consistent for a period of time (e.g., the period of time between a first sampling and a follow-on second sampling). In certain other embodiments, a determination may be performed as to the duration of the resource request and, thus, the total amount of resources utilized by the request. Such a configuration may denote such requests as they may be sampled over a plurality of sampling points. However, other embodiments may obtain a simple snapshot and may ignore the duration of the request and instead allocate all resource requests that are being responded to within a set sampling time to the timeframe between samples. The snapshot of such an embodiment may be directed to the instantaneous rate of resources consumed (e.g., a rate of 5 kilobytes per second consumed by a first tenant during the time of the snapshot) by the various tenants of a multi-tenant system during the point in time and the rate may be extrapolated over the full time period (e.g., consumption of 5 kilobytes over a period of a second) that the snapshot is associated with to determine the amount of resources consumed.

In certain embodiments, the multi-tenant server system may utilize the forecasting to determine the amount of resources to obtain and/or to provide for future purposes (e.g., for services in the future). Furthermore, the forecasting may be provided via one or more outputs and/or other interfaces to a user.

HeroHock, in their search for more accurate forecasting techniques, switches to a forecasting system similar to system 100. They then configure their databases to obtain already existing context data from the resource requests of their tenants. Their database is then configured to store such context data and associated requests, as well as to associate the context data with the corresponding resource request. HeroHock's database is further configured to store the context data and resource request and provide for periodic snapshots of the resource requests and associated context data to allow for determination of resource usage. To minimize resource usage, HeroHock's snapshots are configured to obtain snapshots of only a moment in time, every 5 seconds. Resource usage is then extrapolated from such snapshots for the full 5 seconds. HeroHock further configures an application within their system to provide for forecasting of future usage based on the determined resource usage.

Figure 2:
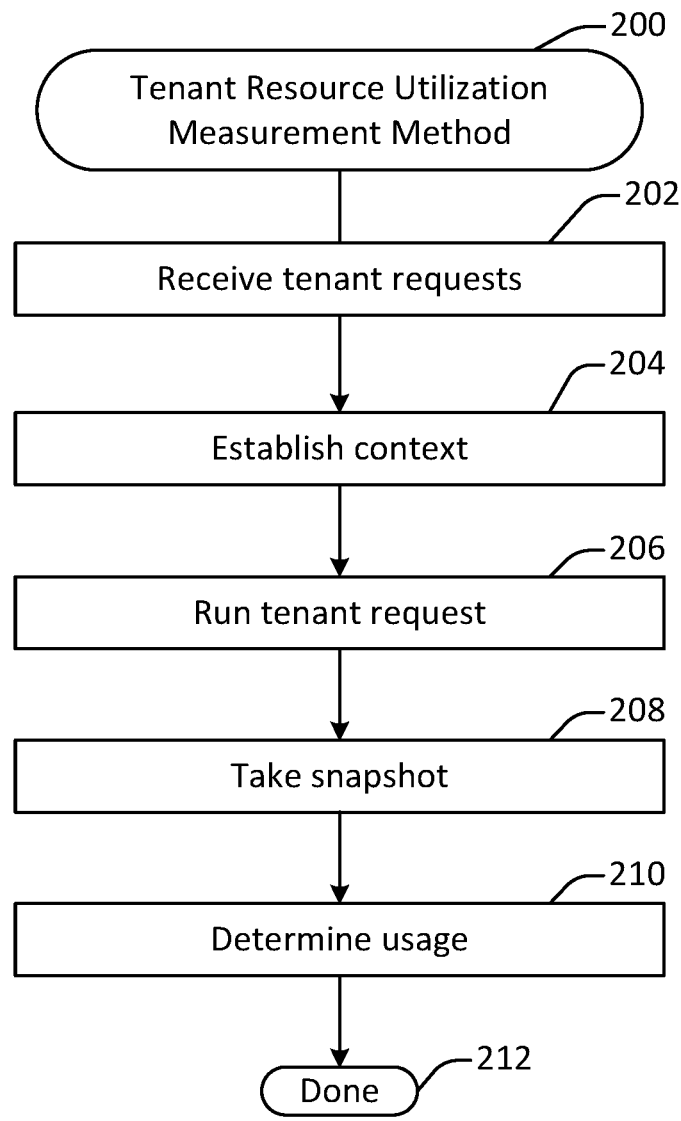
FIG. 2 illustrates an example of a method for multi-tenant resource utilization measurement, performed in accordance with one or more embodiments.

FIG. 2 illustrates an example of a method for multi-tenant resource utilization measurement, performed in accordance with one or more embodiments. FIG. 2 illustrates a tenant resource utilization measurement method 200 that may provide for resource utilization determination and/or forecasting in a multi-tenant system.

In 202, tenant resource requests may be received. The tenant resource requests may be requests for resources provided by the multi-tenant system, such as processing, memory, APIs, software resources, and/or other such resources. The tenant requests may include context data and/or context data for the tenant requests may be generated by one or more programs and/or APIs of the multi-tenant server system.

In 204, the tenant requests and/or context data may be provided to a database, such as a production database as described herein. The context data may allow for determination of the identity of the tenant providing the request as well as other aspects of request, such as the resource types requested, the amount of resources requested, the actions to be performed by the request, the timeframe of the request, and/or other such aspects.

Before, during, and/or after context is established in 204, the tenant request may be performed in 206. Thus, the resources requested during the tenant request may be provided in 206.

In 208, a snapshot may be performed to determine resource usage during a moment in time and/or for a time period. In various embodiments, such a snapshot may be a sampling of the resource usage during a momentary period (e.g., usage during one point in time), during a portion of a time period (e.g., usage during 2 seconds of a one minute period), and/or for a full time period (e.g., for all 60 seconds of a 60 second time period). In certain embodiments, snapshots of a momentary period may be less resource intensive for gathering the requests and/or determining the context of the requests (e.g., as there are less data points to analyze). Snapshots of a longer period of time may allow for more accurate forecasting.

In 210, usage of the resources may be determined. Determination of the usage of the resources may include determining which resources are used by which tenants of a multi-tenant system as well as other determinations and/or forecasting.

Figure 3:
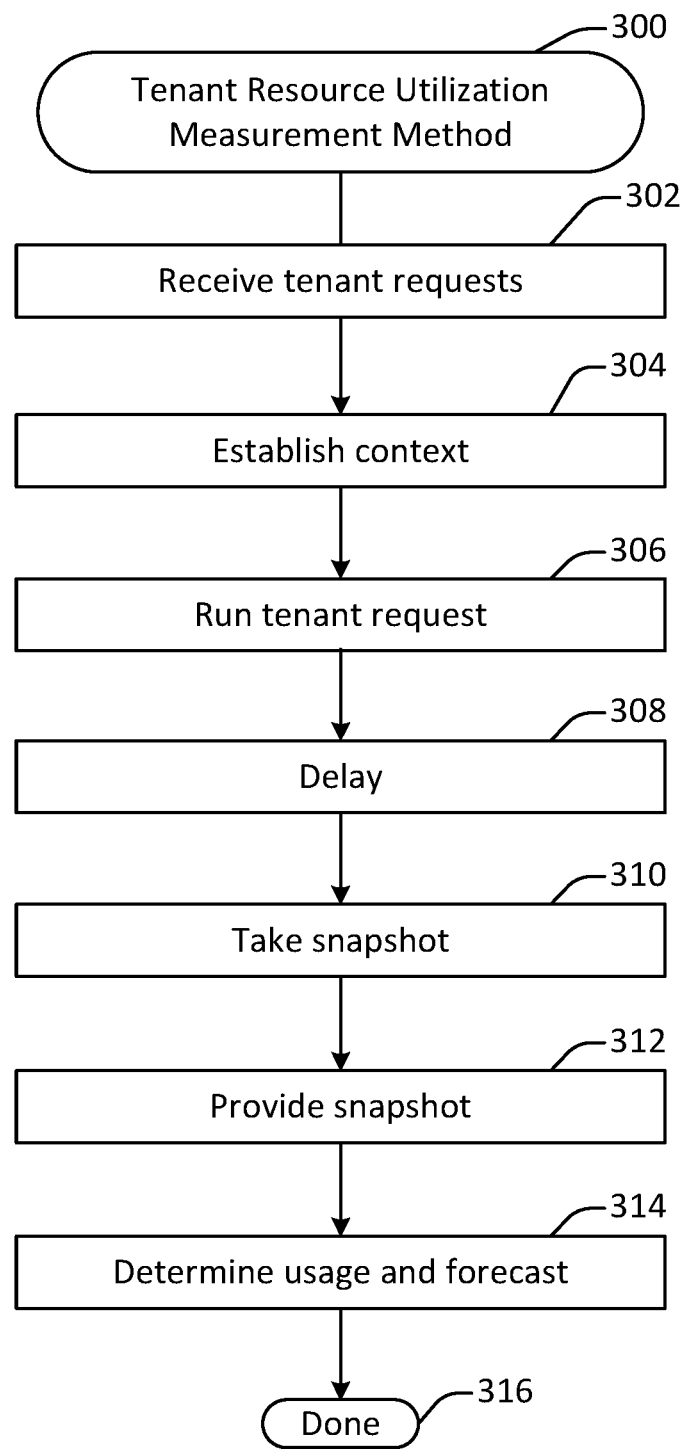
FIG. 3 illustrates another example of a method for multi-tenant resource utilization measurement, performed in accordance with one or more embodiments.

FIG. 3 illustrates another example of a method for multi-tenant resource utilization measurement, performed in accordance with one or more embodiments. FIG. 3 illustrate tenant resource utilization measurement method 300. Tenant resource utilization measurement method 300 may include aspects of tenant resource utilization measurement method 200. Thus, for example, tenant requests may be received in 302 similar to that of 202, context may be established in 304 similar to that of 204, and tenant requests may be performed (e.g., resources provided) in 306 similar to that of 206.

In 308, a delay may be performed before a snapshot is obtained in 310. Accordingly, in tenant resource utilization measurement method 300, the snapshot obtained in 310 is obtained after tenant requests have been run. In various embodiments, delaying the snapshot may allow for commencement of fulfillment of tenant resource requests before a snapshot is obtained, allowing for a more accurate determination of resources utilized when a snapshot is taken for only a moment in time and/or for a portion of a time period. Resources may thus be devoted to fulfilling customer requests, which may be more time sensitive than forecasting. In other embodiments, snapshots may be taken in a periodic manner and the delay of 308 may be delay between snapshots obtained. Obtaining the snapshot in 310 may be similar to that of 208.

In 312, for embodiments providing for forecasting of future usage, the snapshot may be provided to an application, a store, and/or another destination in 312, as described herein. Such a destination may obtain the data of the snapshot and provide for forecasting. In certain embodiments, data provided may include the resource request as well as the context data associated with the resource request, as well as data directed to the time period and/or point in time associated with the snapshot.

Based on the data provided in 312, usage may be determined in 314. Furthermore, forecasting of future data usage may also be performed in 314 by the destination that the data was provided to in 312. Thus, an application or a store may receive the snapshot, determine the context, and provide forecasts for the future usage of one or more tenants of the multi-tenant system as well as for the system as a whole. In certain embodiments, providing a forecast for one or more individual tenants of a multi-tenant system may allow for adjustment of forecasts based on tenants joining or leaving a multi-tenant system. Accordingly, a computing system that may include a plurality of resource clusters (e.g., a plurality of multi-tenant computing systems and/or database) may optimize each resource cluster by allocating tenants to specific resource clusters in order to maximize utilization of each specific resource cluster and, thus, minimize wasted resources.

After HeroHock has implemented their new multi-tenant resource forecasting system, HeroHock's system obtains periodic snapshots of the resource usage and associated context data. Based on the periodic snapshots and associated context data, resource usage of the various tenants of the multi-tenant system of HeroHock is determined. Each snapshot allows for HeroHock to determine an event corresponding to the resource usage of the timeframe of the snapshot. The events allow for HeroHock to determine the identity of the tenants utilizing the resources taken during the snapshot. The application of HeroHock then obtains the events (e.g., through one or more communications mediums) and provides for an estimate of the resources used by the tenants and a forecast of future resource usage. Utilizing the new multi-tenant resource forecasting technique, HeroHock is able to save on processing resources used for forecasting. Furthermore, the multi-tenant resource forecasting technique, through the use of the context data associated with each resource request, is able to determine the identity of the requesting user for each resource request, resulting in more accurate forecasts and less wasted resources for HeroHock.

Figure 4:
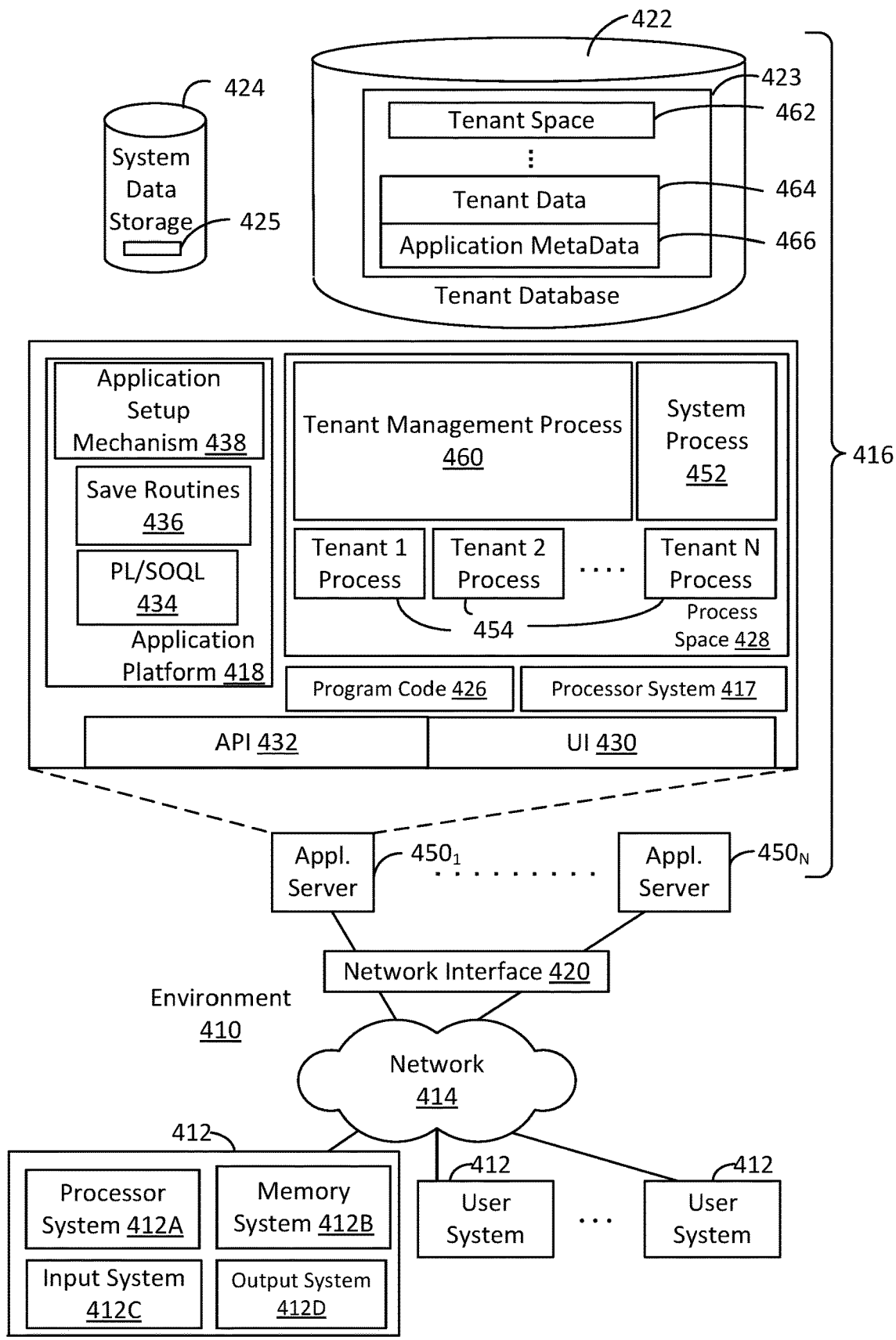
FIG. 4 shows a block diagram of an example of an environment that includes an on-demand multi-tenant resource service, configured in accordance with some embodiments.

FIG. 4 shows a block diagram of an example of an environment 410 that includes an on-demand database service configured in accordance with some embodiments. Environment 410 may include user systems 412, network 414, database system 416, processor system 417, application platform 418, network interface 420, tenant data storage 422, tenant data 423, system data storage 424, system data 425, program code 426, process space 428, User Interface (UI) 430, Application Program Interface (API) 432, PL/SOQL 434, save routines 436, application setup mechanism 438, application servers 450-1 through 450-N, system process space 452, tenant process spaces 454, tenant management process space 460, tenant storage space 462, user storage 464, and application metadata 466. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 416, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 418 may be a framework that allows the creation, management, and execution of applications in system 416. Such applications may be developed by the database service provider or by users or third-party application developers accessing the service. Application platform 418 includes an application setup mechanism 438 that supports application developers' creation and management of applications, which may be saved as metadata into tenant data storage 422 by save routines 436 for execution by subscribers as one or more tenant process spaces 454 managed by tenant management process 460 for example. Invocations to such applications may be coded using PL/SOQL 434 that provides a programming language style interface extension to API 432. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 466 for a subscriber making such an invocation. Such system processes may also manage execution of application metadata 466 as an application in a virtual machine.

In some implementations, each application server 450 may handle requests for any user associated with any organization. A load balancing function (e.g., an F5 Big-IP load balancer) may distribute requests to the application servers 450 based on an algorithm such as least-connections, round robin, observed response time, etc. Each application server 450 may be configured to communicate with tenant data storage 422 and the tenant data 423 therein, and system data storage 424 and the system data 425 therein to serve requests of user systems 412. The tenant data 423 may be divided into individual tenant storage spaces 462, which can be either a physical arrangement and/or a logical arrangement of data. Within each tenant storage space 462, user storage 464 and application metadata 466 may be similarly allocated for each user. For example, a copy of a user's most recently used (MRU) items might be stored to user storage 464. Similarly, a copy of MRU items for an entire tenant organization may be stored to tenant storage space 462. A UI 430 provides a user interface and an API 432 provides an application programming interface to system 416 resident processes to users and/or developers at user systems 412.

System 416 may implement a web-based multi-tenant resource determination and forecasting system. For example, in some implementations, system 416 may include application servers configured to implement and execute multi-tenant resource determination and forecasting software applications. The application servers may be configured to provide related data, code, forms, web pages and other information to and from user systems 412. Additionally, the application servers may be configured to store information to, and retrieve information from a database system. Such information may include related data, objects, and/or Webpage content. With a multi-tenant system, data for multiple tenants may be stored in the same physical database object in tenant data storage 422, however, tenant data may be arranged in the storage medium(s) of tenant data storage 422 so that data of one tenant is kept logically separate from that of other tenants. In such a scheme, one tenant may not access another tenant's data, unless such data is expressly shared.

Several elements in the system shown in FIG. 4 include conventional, well-known elements that are explained only briefly here. For example, user system 412 may include processor system 412A, memory system 412B, input system 412C, and output system 412D. A user system 412 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 412 to access, process and view information, pages and applications available from system 416 over network 414. Network 414 may be any network or combination of networks of devices that communicate with one another, such as any one or any combination of a LAN (local area network), WAN (wide area network), wireless network, or other appropriate configuration.

The users of user systems 412 may differ in their respective capacities, and the capacity of a particular user system 412 to access information may be determined at least in part by "permissions" of the particular user system 412. As discussed herein, permissions generally govern access to computing resources such as data objects, components, and other entities of a computing system, such as a multi-tenant resource determination and forecasting system, a social networking system, and/or a CRM database system. "Permission sets" generally refer to groups of permissions that may be assigned to users of such a computing environment. For instance, the assignments of users and permission sets may be stored in one or more databases of System 416. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 416 may provide on-demand database service to user systems 412 using an MTS arrangement. By way of example, one tenant organization may be a company that employs a sales force where each salesperson uses system 416 to manage their sales process. Thus, a user in such an organization may maintain contact data, leads data, customer follow-up data, performance data, goals and progress data, etc., all applicable to that user's personal sales process (e.g., in tenant data storage 422). In this arrangement, a user may manage his or her sales efforts and cycles from a variety of devices, since relevant data and applications to interact with (e.g., access, view, modify, report, transmit, calculate, etc.) such data may be maintained and accessed by any user system 412 having network access.

When implemented in an MTS arrangement, system 416 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 416 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 416 may also maintain system-level data usable by multiple tenants or other data. Such system-level data may include industry reports, news, postings, and the like that are sharable between tenant organizations.

In some implementations, user systems 412 may be client systems communicating with application servers 450 to request and update system-level and tenant-level data from system 416. By way of example, user systems 412 may send one or more queries requesting data of a database maintained in tenant data storage 422 and/or system data storage 424. An application server 450 of system 416 may automatically generate one or more SQL statements (e.g., one or more SQL queries) that are designed to access the requested data. System data storage 424 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 5A:
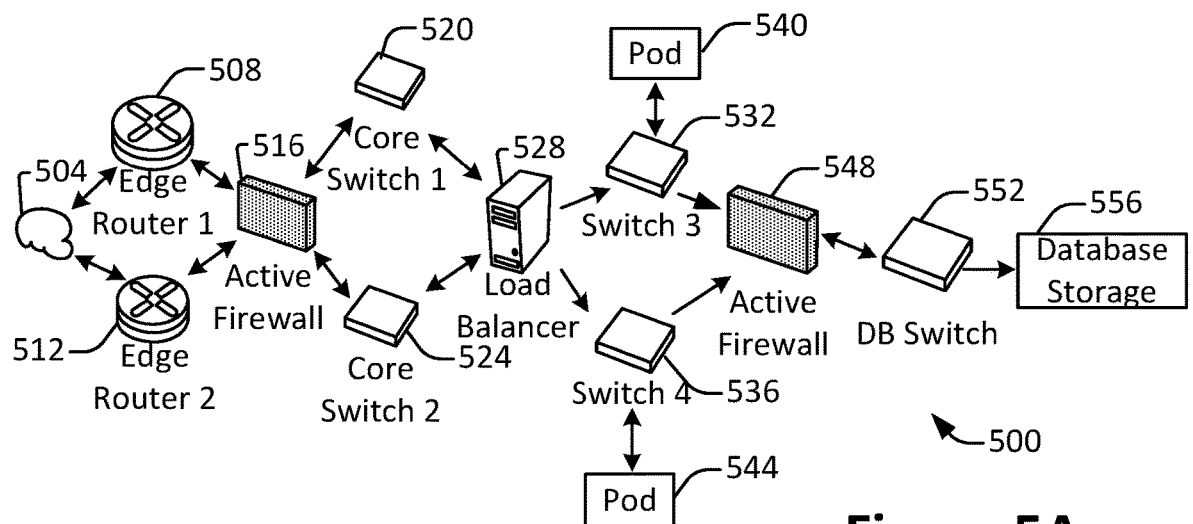
FIGS. 5A and 5B illustrate examples of a computing system, configured in accordance with one or more embodiments.

FIG. 5A shows a system diagram of an example of architectural components of an on-demand database service environment 500, configured in accordance with some implementations. A client machine located in the cloud 504 may communicate with the on-demand database service environment via one or more edge routers 508 and 512. A client machine may include any of the examples of user systems 412 described above. The edge routers 508 and 512 may communicate with one or more core switches 520 and 524 via firewall 516. The core switches may communicate with a load balancer 528, which may distribute server load over different pods, such as the pods 540 and 544 by communication via pod switches 532 and 536. The pods 540 and 544, which may each include one or more servers and/or other computing resources, may perform data processing and other operations used to provide on-demand services. Components of the environment may communicate with a database storage 556 via a database firewall 548 and a database switch 552.

Accessing an on-demand database service environment may involve communications transmitted among a variety of different components. The environment 500 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 5A and 5B.

The cloud 504 refers to any suitable data network or combination of data networks, which may include the Internet. Client machines located in the cloud 504 may communicate with the on-demand database service environment 500 to access services provided by the on-demand database service environment 500. By way of example, client machines may access the on-demand database service environment 500 to retrieve, store, edit, and/or process multi-tenant resource utilization information.

In some implementations, the edge routers 508 and 512 route packets between the cloud 504 and other components of the on-demand database service environment 500. The edge routers 508 and 512 may employ the Border Gateway Protocol (BGP). The edge routers 508 and 512 may maintain a table of IP networks or 'prefixes', which designate network reachability among autonomous systems on the internet.

In one or more implementations, the firewall 516 may protect the inner components of the environment 500 from internet traffic. The firewall 516 may block, permit, or deny access to the inner components of the on-demand database service environment 500 based upon a set of rules and/or other criteria. The firewall 516 may act as one or more of a packet filter, an application gateway, a stateful filter, a proxy server, or any other type of firewall.

In some implementations, the core switches 520 and 524 may be high-capacity switches that transfer packets within the environment 500. The core switches 520 and 524 may be configured as network bridges that quickly route data between different components within the on-demand database service environment. The use of two or more core switches 520 and 524 may provide redundancy and/or reduced latency.

In some implementations, communication between the pods 540 and 544 may be conducted via the pod switches 532 and 536. The pod switches 532 and 536 may facilitate communication between the pods 540 and 544 and client machines, for example via core switches 520 and 524. Also or alternatively, the pod switches 532 and 536 may facilitate communication between the pods 540 and 544 and the database storage 556. The load balancer 528 may distribute workload between the pods, which may assist in improving the use of resources, increasing throughput, reducing response times, and/or reducing overhead. The load balancer 528 may include multilayer switches to analyze and forward traffic.

In some implementations, access to the database storage 556 may be guarded by a database firewall 548, which may act as a computer application firewall operating at the database application layer of a protocol stack. The database firewall 548 may protect the database storage 556 from application attacks such as structure query language (SQL) injection, database rootkits, and unauthorized information disclosure. The database firewall 548 may include a host using one or more forms of reverse proxy services to proxy traffic before passing it to a gateway router and/or may inspect the contents of database traffic and block certain content or database requests. The database firewall 548 may work on the SQL application level atop the TCP/IP stack, managing applications' connection to the database or SQL management interfaces as well as intercepting and enforcing packets traveling to or from a database network or application interface.

In some implementations, the database storage 556 may be an on-demand database system shared by many different organizations. The on-demand database service may employ a single-tenant approach, a multi-tenant approach, a virtualized approach, or any other type of database approach.

Communication with the database storage 556 may be conducted via the database switch 552. The database storage 556 may include various software components for handling database queries. Accordingly, the database switch 552 may direct database queries transmitted by other components of the environment (e.g., the pods 540 and 544) to the correct components within the database storage 556.

Figure 5B:
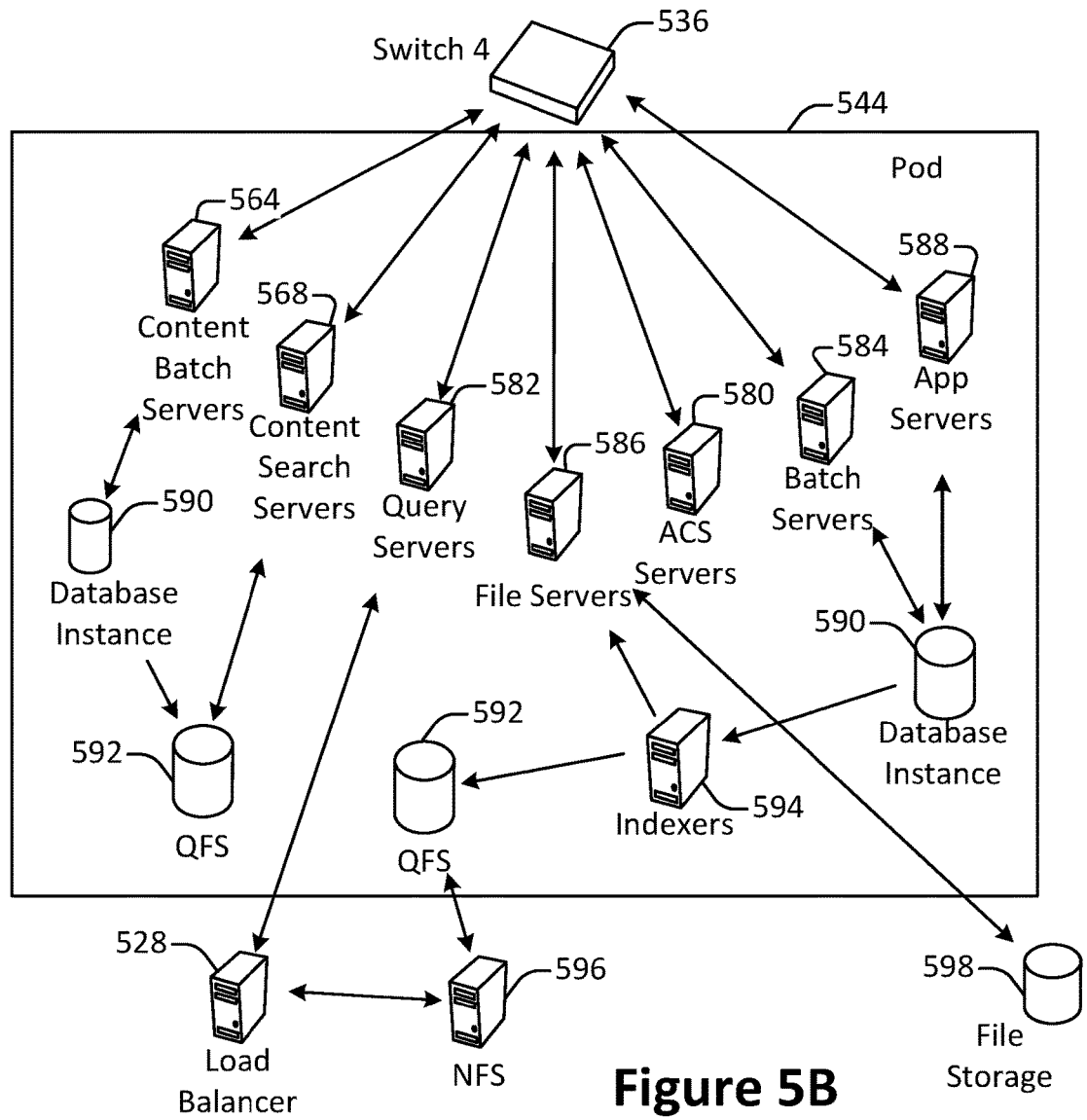

FIG. 5B shows a system diagram further illustrating an example of architectural components of an on-demand database service environment, in accordance with some implementations. The pod 544 may be used to render services to user(s) of the on-demand database service environment 500. The pod 544 may include one or more content batch servers 564, content search servers 568, query servers 582, file servers 586, access control system (ACS) servers 580, batch servers 584, and app servers 588. Also, the pod 544 may include database instances 590, quick file systems (QFS) 592, and indexers 594. Some or all communication between the servers in the pod 544 may be transmitted via the switch 536.

In some implementations, the app servers 588 may include a framework dedicated to the execution of procedures (e.g., programs, routines, scripts) for supporting the construction of applications provided by the on-demand database service environment 500 via the pod 544. One or more instances of the app server 588 may be configured to execute all or a portion of the operations of the services described herein.

In some implementations, as discussed above, the pod 544 may include one or more database instances 590. A database instance 590 may be configured as an MTS in which different organizations share access to the same database, using the techniques described above. Database information may be transmitted to the indexer 594, which may provide an index of information available in the database 590 to file servers 586. The QFS 592 or other suitable filesystem may serve as a rapid-access file system for storing and accessing information available within the pod 544. The QFS 592 may support volume management capabilities, allowing many disks to be grouped together into a file system. The QFS 592 may communicate with the database instances 590, content search servers 568 and/or indexers 594 to identify, retrieve, move, and/or update data stored in the network file systems (NFS) 596 and/or other storage systems.

In some implementations, one or more query servers 582 may communicate with the NFS 596 to retrieve and/or update information stored outside of the pod 544. The NFS 596 may allow servers located in the pod 544 to access information over a network in a manner similar to how local storage is accessed. Queries from the query servers 522 may be transmitted to the NFS 596 via the load balancer 528, which may distribute resource requests over various resources available in the on-demand database service environment 500. The NFS 596 may also communicate with the QFS 592 to update the information stored on the NFS 596 and/or to provide information to the QFS 592 for use by servers located within the pod 544.

In some implementations, the content batch servers 564 may handle requests internal to the pod 544. These requests may be long-running and/or not tied to a particular customer, such as requests related to log mining, cleanup work, and maintenance tasks. The content search servers 568 may provide query and indexer functions such as functions allowing users to search through content stored in the on-demand database service environment 500. The file servers 586 may manage requests for information stored in the file storage 598, which may store information such as documents, images, basic large objects (BLOBs), etc. The query servers 582 may be used to retrieve information from one or more file systems. For example, the query system 582 may receive requests for information from the app servers 588 and then transmit information queries to the NFS 596 located outside the pod 544. The ACS servers 580 may control access to data, hardware resources, or software resources called upon to render services provided by the pod 544. The batch servers 584 may process batch jobs, which are used to run tasks at specified times. Thus, the batch servers 584 may transmit instructions to other servers, such as the app servers 588, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 6:
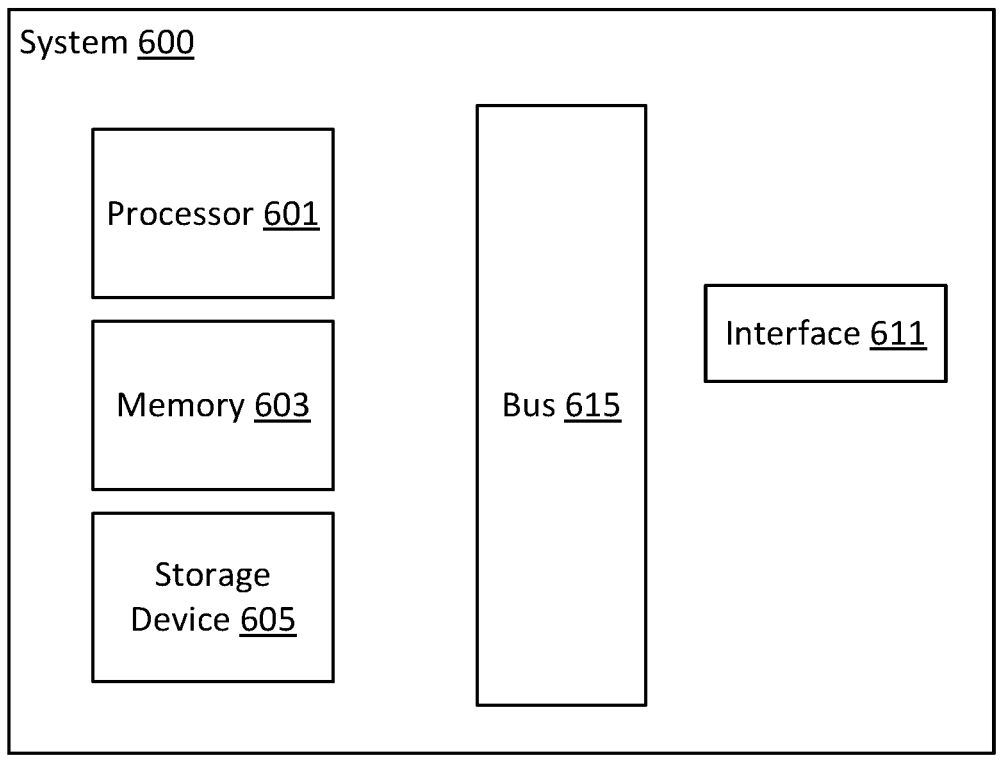
FIG. 6 illustrates an example of a computing device, configured in accordance with one or more embodiments.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as those described herein. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A system comprising:
   a database; and
   a computing pod, configured to provide on-demand computing services to a plurality of tenant entities, the computing pod comprising a processor pod shared by the plurality of tenant entities, the computing pod configured to:
   receive, in a computing pod of a computing system providing computing services to a plurality of different entities sharing a common resource of the computing pod, resource utilization requests from the plurality of different entities;
   store, in a database, context data associated with the resource utilization requests, the context data comprising indications of the entities that provided the resource utilization requests and a duration of using the common resource;
   obtain first and second snapshots from the database, the first and second snapshots comprising first and second context data associated with a first entity and a second entity for a first time period and a second time period;
   determine, based on the first and second snapshots, first and second usage data for the first entity and the second entity during the first time period and the second time period, the first and second usage data indicating a first and second quantity of resource usage of the computing pod for the first entity and the second entity;
   forecast, based on the first and second context data and the first and second usage data, resource usage for the first entity and the second entity for an upcoming time period, wherein the first and second context data are utilized to adjust the first and second usage data, based on the duration of using the common resource, to determine the resource usage forecast for the first entity and the second entity; and
   configure the computing system based on the forecast resource usage.

2. The system of claim 1, wherein the forecasting comprises using a machine learning application to create a forecast for the resource usage by the first entity.

3. The system of claim 1, wherein the first entity is a tenant of a multi-tenant server system running in the computing pod.

4. The system of claim 1, further comprising a container, wherein the computing pod is included within the container.

5. The system of claim 1, wherein the first context data comprises planned future resource usage changes for the first entity.

6. The system of claim 5, wherein the planned future usage change comprises a planned usage decrease for first entity, and wherein the adjustment of the first usage data comprises decreasing the resource usage forecast for the first entity.

7. The system of claim 5, wherein the planned future usage change comprises a planned usage increase for first entity, and wherein the adjustment of the first usage data comprises increasing the resource usage forecast for the first entity.

8. The system of claim 1, wherein the resource utilization requests are received during a first timeframe less than the first time period, and wherein the determining the first usage data comprises extrapolating the first usage data within the first timeframe from the snapshot.

9. A method comprising:
   receiving, in a computing pod of a computing system providing computing services to a plurality of different entities sharing a common resource of the computing pod, resource utilization requests from the plurality of different entities;
   storing, in a database, context data associated with the resource utilization requests, the context data comprising indications of the entities that provided the resource utilization requests and a duration of using the common resource;
   obtaining first and second snapshots from the database, the first and second snapshots comprising first and second context data associated with a first entity and a second entity for a first time period and a second time period;
   determining, based on the first and second snapshots, first and second usage data for the first entity and the second entity during the first time period and the second time period, the first and second usage data indicating a first and second quantity of resource usage of the computing pod for the first entity and the second entity;
   forecasting, based on the first and second context data and the first and second usage data, resource usage for the first entity and the second entity for an upcoming time period, wherein the first and second context data are utilized to adjust the first and second usage data, based on the duration of using the common resource, to determine the resource usage forecast for the first entity and the second entity; and
   configuring the computing system based on the forecast resource usage.

10. The method of claim 9, wherein the forecasting comprises using a machine learning application to create a forecast for the resource usage by the first entity.

11. The method of claim 9, wherein the first entity is a tenant of a multi-tenant server system running in the computing pod.

12. The method of claim 9, wherein the computing pod is included within a container of the computing system.

13. The method of claim 9, wherein the first context data comprises planned future resource usage changes for the first entity.

14. The method of claim 13, wherein the planned future usage change comprises a planned usage decrease for first entity, and wherein the adjustment of the first usage data comprises decreasing the resource usage forecast for the first entity.

15. The method of claim 13, wherein the planned future usage change comprises a planned usage increase for first entity, and wherein the adjustment of the first usage data comprises increasing the resource usage forecast for the first entity.

16. The method of claim 9, wherein the resource utilization requests are received during a first timeframe less than the first time period, and wherein the determining the first usage data comprises extrapolating the first usage data within the first timeframe from the snapshot.

17. One or more non-transitory computer-readable medium having instructions stored thereon for performing a method, the method comprising:
- receiving, in a computing pod of a computing system providing computing services to a plurality of different entities sharing a common resource of the computing pod, resource utilization requests from the plurality of different entities;
- storing, in a database, context data associated with the resource utilization requests, the context data comprising indications of the entities that provided the resource utilization requests and a duration of using the common resource;
- obtaining first and second snapshots from the database, the first and second snapshots comprising first and second context data associated with a first entity and a second entity for a first time period and a second time period;
- determining, based on the first and second snapshots, first and second usage data for the first entity and the second entity during the first time period and the second time period, the first and second usage data indicating a first and second quantity of resource usage of the computing pod for the first entity and the second entity;
- forecasting, based on the first and second context data and the first and second usage data, resource usage for the first entity and the second entity for an upcoming time period, wherein the first and second context data are utilized to adjust the first and second usage data, based on the duration of using the common resource, to determine the resource usage forecast for the first entity and the second entity; and
- configuring the computing system based on the forecast resource usage.

18. The computer program product of claim 17, wherein the forecasting comprises using a machine learning application to create a forecast for the resource usage by the first entity.

19. The computer program product of claim 17, wherein the first entity is a tenant of a multi-tenant server system running in the computing pod.

20. The computer program product of claim 17, wherein the first context data comprises planned future resource usage changes for the first entity.

* * * * *